Oct. 19, 1943.   G. F. FORSTHOEFEL ET AL   2,332,214
PRESELECTED BOTTLE DISPENSER
Filed May 1, 1941   3 Sheets-Sheet 1

Inventor
Gregg F. Forsthoefel
Howard D. White

By Albert R. Henry
Attorney

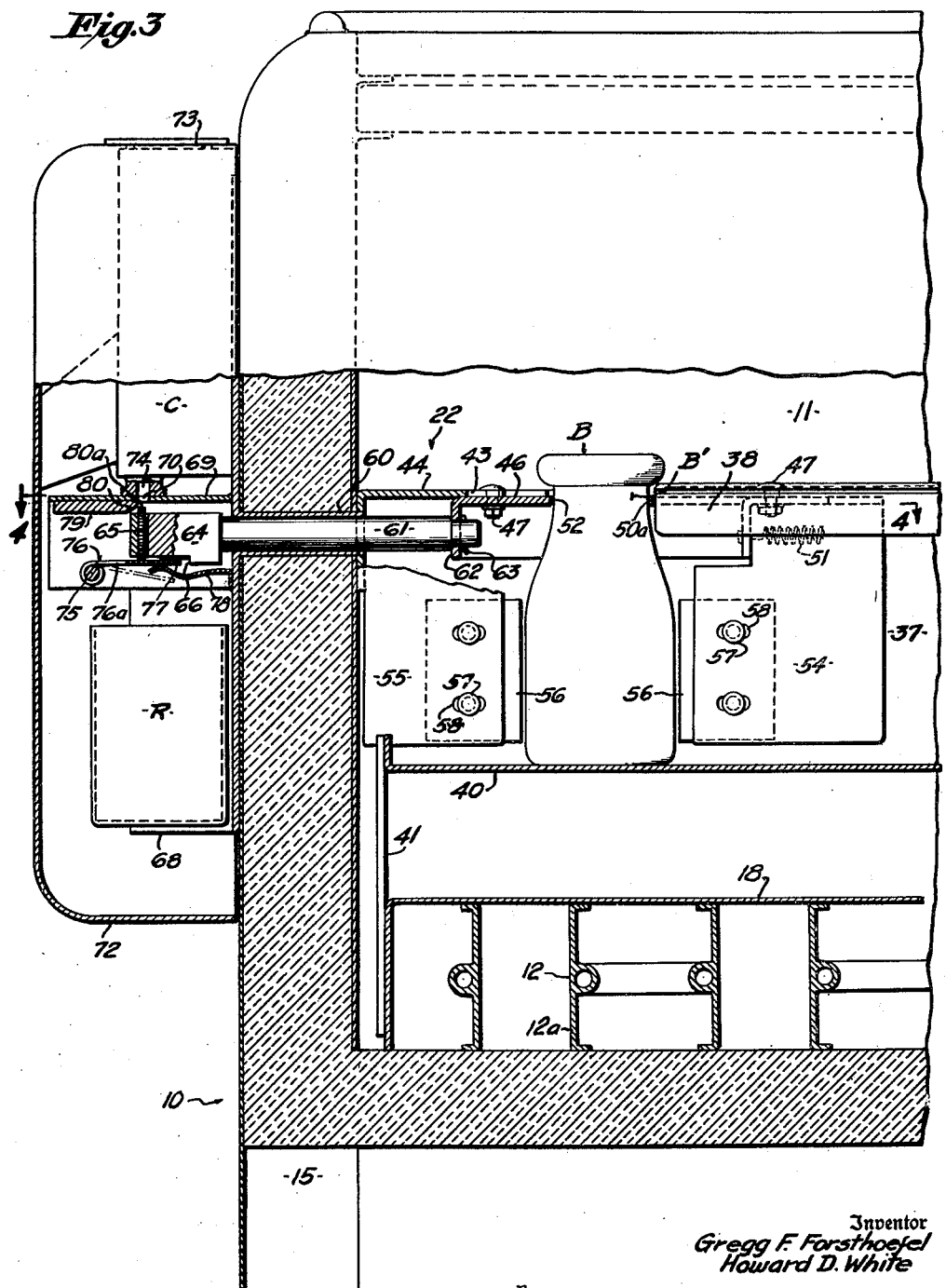

Patented Oct. 19, 1943

2,332,214

UNITED STATES PATENT OFFICE 2,332,214

PRESELECTED BOTTLE DISPENSER

Gregg F. Forsthoefel and Howard D. White, Adrian, Mich., assignors to Revco, Inc., Adrian, Mich.

Application May 1, 1941, Serial No. 391,277

8 Claims. (Cl. 312—45)

This invention relates to bottle dispensing mechanism, and it has particular reference to a self-service bottle dispensing and vending device, from which the customer may select any one of a number of bottles containing different liquids.

The invention will be described with particular reference to a dispenser for milk bottles, adapted to contain sweet milk, buttermilk, and the various other beverages packaged in such bottles, and wherein the customer may, upon insertion of a coin, remove a bottle containing the liquid of his preference.

The general purpose of the invention is to devise an improved dispenser suited for such vending, and one which can be readily serviced and refilled, easily manipulated by the customer, and which is designed for simplicity and positive action.

Among other features of the invention are the provision of a retaining magazine or grid, for supporting the bottles, constructed to preclude unauthorized removal, and yet readily removable from the containing cabinet for cleaning. With such magazine is associated a simple loading station, which, when not being operated, locks the magazine in place.

Another feature of the invention is the provision of refrigerating or cooling apparatus for the bottles, so as to make their contents more palatable and less likely to spoil, and wherein a cold air blast is directed over the bottoms of the bottles, as well as the sides, thus reducing surface dampness.

Another feature is the provision of an easily operated trap or escapement mechanism for the bottles, wherein, after the escapement has been freed by the insertion of a coin, the bottle may be removed with one hand, it being unnecessary to hold the release with the other. This mechanism is also advantageously so formed that the bottle is removed in a straight lifting motion, without wrenching or twisting, and, as the removal is effected, a guard plate comes into operation to prevent the removal of a second bottle until another coin has been inserted.

Other features of the invention, as well as the foregoing, will be more clearly understood from the following description of a preferred embodiment, illustrated in the accompanying drawings, wherein:

Fig. 3 is an enlarged section on the line 3—3 of Fig. 1; and

Figure 1:
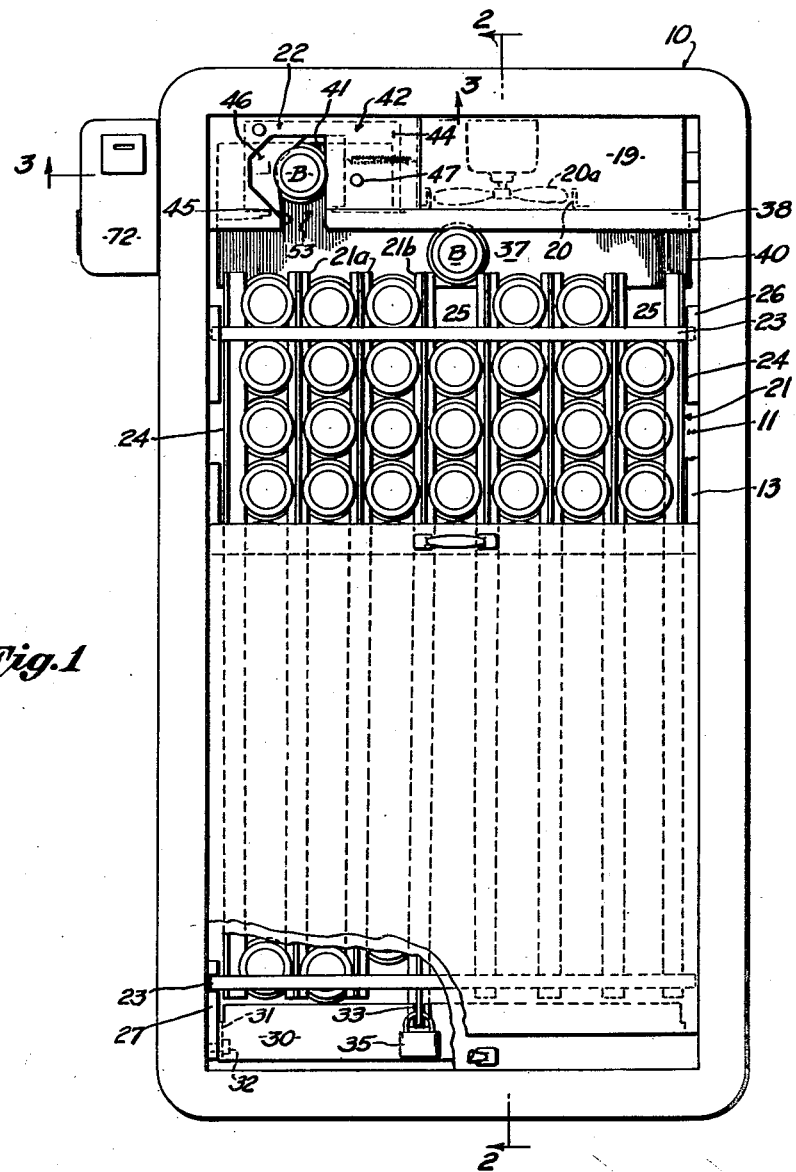
Fig. 1 is a top view of the vending machine with the compartment covers shown in open position.

The dispensing device comprises a cabinet 10 having an open refrigerated compartment 11 in which bottles B are stored and are maintained at a proper temperature by an evaporator coil 12. A pair of covers, mounted in slide rails 13 disposed adjacent the open top of the cabinet, may be slid open to permit access to the bottles by the customer or to permit filling of the magazine with a fresh supply.

The cabinet 10 is also formed with a compressor compartment 15 underlying the compartment 11, and containing any type of refrigerant compressor and condenser unit 16 suitable to retain and control proper temperature conditions within the compartment 11.

Figure 2:
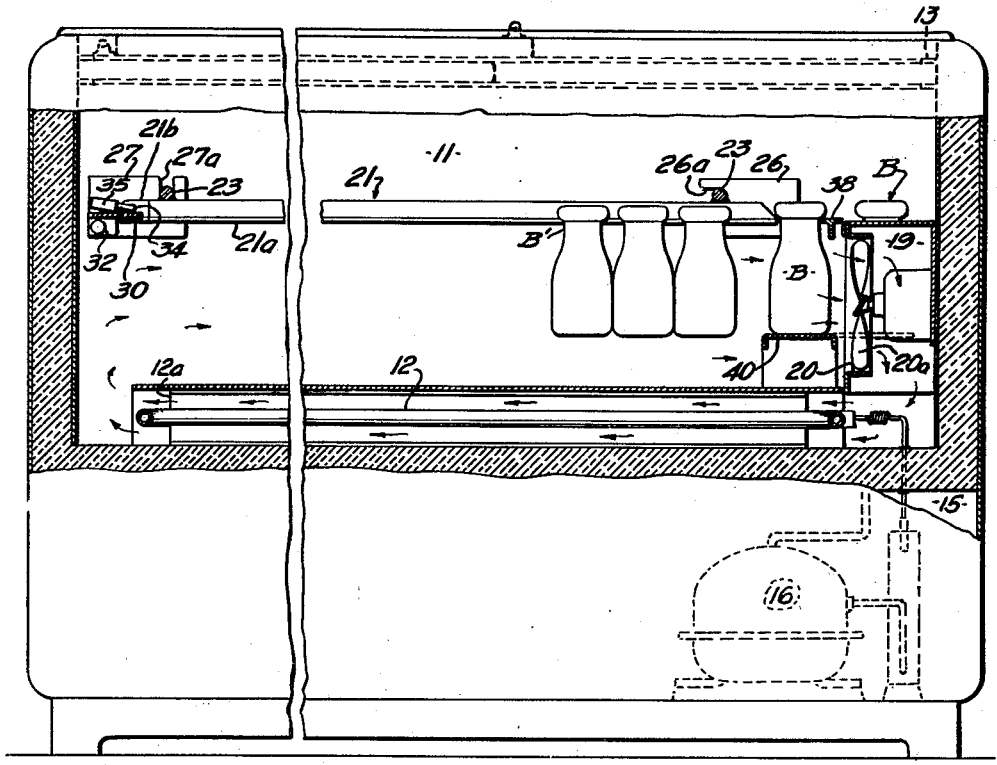
Fig. 2 is a section on the line 2—2 of Fig. 1.

As will be seen in Figs. 2 and 3, the coil 12 is covered by a sheet metal duct member 18, one end of which member leads into a blower casing 19, while the other and open end is spaced from the left hand end of the compartment 11. The casing 19 is formed with a shrouded opening 20 leading into the compartment 11, and a motor-driven suction fan 20a is disposed in this opening, so that relatively warm air may be withdrawn from the compartment 11 and directed downward and through the duct 18 for recooling by the coil 12. It will be noted that the coil 12 is formed with a number of passes, each having a fin 12a thereon, which fins are longitudinally disposed in the air duct 18.

The compartment 11 is supplied with a magazine or bottle rack 21, which is so formed that bottles B may be selected and manually advanced into a bottle release mechanism 22, without, however, the chance of unauthorized removal. The rack 21 consists of a plurality of inverted T-bars 21a, 21b, which are welded in spaced relation to a pair of rods 23. The outermost members of this assembly may be inverted angle bars 24 rather than T-bars. The bars are suitably spaced to receive therebetween the neck portions B' of the bottles, which are suspended therefrom, as shown in Fig. 2. The mounting rods 23 are positioned in pairs of brackets 26, 27, mounted on the side walls of the compartment 11. The brackets are formed with horizontal and vertical notches 26a, 27a respectively, for receiving the ends of the rods 23. It will be apparent that the rack 21 may be completely removed from the compartment 11 by simply lifting the left hand end from the brackets 27 and then sliding it longitudinally to clear the remaining rod from the brackets 26.

When thus assembled, it will be seen that the bars 21a, 21b, and 24 are spaced from the left hand wall of the compartment 11 a sufficient distance to permit insertion of the bottles in each of the bar spaces. A lock plate 30, formed with bent terminals 31, is mounted for hinging movement in this space by means of pivot studs 32 which extend through the terminals 31 and into the adjacent brackets 27. When it is desired to lock the magazine after the loading operation, the plate 30 is swung down to the position shown in Fig. 2 to cover the loading space. One of the T-bars 21b is longer than the remaining bars, and the lock plate 30 is notched, as indicated at 33, to straddle this bar. The bar 21b contains a hole 34 for receiving a padlock 35 which effectively retains the plate 30 and rack 21 in closed position.

A transverse aisle 37 is provided at the opposite end of the compartment 11, to communicate with all of the bottle spaces or aisles 25 of the magazine 21. This is formed by a transverse T-bar 38 welded to the forward edge of the fan casing 19, in spaced relation to the right hand terminals of the bars 21a, 21b and rods 23. A sheet metal platform 40 forms a floor for the transverse aisle, and it is supported by uprights 41 extending upwardly from the underlying duct 18 (Fig. 3).

It will now be seen that a bottle may be selected from any of the aisles 25 of the magazine 21, and slid longitudinally for entry into the transverse aisle 37, where it rests on the platform 40. The bottle may then be slid laterally to the entry of the bottle release mechanism 22.

The mechanism 22 consists of a stationary member or box 42 fixed to the compartment 11 and formed with an opening 43 in its top 44. The opening 43 is provided with a restricted throat portion 45 which is spaced from the terminal portion of the transverse T-bar 38 to permit the entry of a bottle B into the box 42 (Figs. 1 and 3). It will be noted that the platform 40 is formed with a bottle supporting extension 41 underlying the box 42. A movable member or bottle release slide 46 (Fig. 4) is mounted for transverse sliding movement beneath the top 44 of the box 42 by means of studs 47 secured in the top 44 and extending into slots 48 in the underlying slide 46. A tension spring 51 secured to the slide 46 and box 42 respectively tends to retain the slide in its closed position, as shown in Fig. 1.

The slide 46 is formed with a notch 50, the left hand edge 52 of which cooperates with the opposed edge 59a of the box opening 43 to provide a bottle imprisoning aisle 53. The box 42 and the slide 46 are provided with depending skirt portions 55 and 54 respectively, which portions carry plates 56, spaced sufficiently from each other (Fig. 3) to guide the lower portion of a bottle B into the box 42. The plates 56 carry studs 57 which extend into slots 58 in the skirt portions 54 and 55, whereby the plates 56 may be adjustably positioned to accommodate bottles of different sizes.

Figure 4:
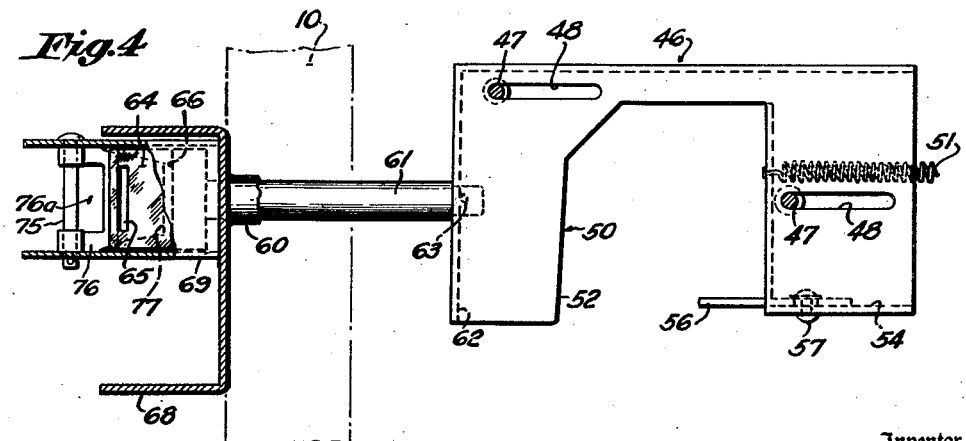
Fig. 4 is a section on the line 4—4 of Fig. 3 with the cabinet and bottle release box omitted to show the structure of the bottle release slide.

The cabinet 10 is formed with an opening containing a bearing 69 for slidably receiving a plunger 61. The inner end of the plunger is secured to a flange 62 on the release slide 46, as indicated by the numeral 63. The outer end of the plunger is formed with a head 64 having a vertical coin slot 65 therein, and an underlying latch shoulder 66 (Figs. 3 and 4).

A bracket 68 is secured to the exterior of the cabinet 10, and an inverted channel shaped guide member 69 is welded thereto. The member 69 serves to guide the head 64 against turning movement, and in addition it is formed with a coin slot 70 registering with the slot 65 in the head 64.

A cover 72 is hinged to the cabinet 10, and it covers the bracket 68 and associated mechanism.

A coin selector unit C is carried in the bracket 68 immediately above the member 69, and this unit may be of any well known type, requiring no detailed description herein, save that it should have a coin inlet 73 and a coin outlet 74 registering with the coin slot 70 of the guide member 69.

The guide member 69 carries a transverse pin 75, upon which a latch 76 is pivotally mounted. The free end 77 of the latch 76 is normally held against the bottom of the plunger head 64 by a leaf spring 78. A cam member 79 is secured beneath the horizontal portion of the member 69, and it is formed with a cam surface 80 which is disposed immediately adjacent the coin slot 65 in the head 64.

It will be seen in Fig. 4 that the latch 76 is formed with a coin slot 76a, which overlies a coin box R, carried in the bracket 68 beneath the guide member 69.

In the operation of the device, when a coin is inserted in the unit C, it drops through the outlet 74 and slot 70 into the slot in the plunger head 64, where the bottom edge of the coin rests upon the underlying latch 76 (Fig. 3). A bottle B, positioned in the box 42, as previously described, may now be gripped by its protruding neck portion and manually lifted, causing the bulging body of the bottle to engage the edge 52 of the release slide 46 in a wedging action, thus moving the slide 46 to the left against the urge of the spring 51. It will be observed that the end 77 of the latch 76 is spaced from the shoulder 66 on the plunger head 64, thus permitting an initial free movement of the slide 46 and accompanying plunger 61.

During this initial movement, the upper and protruding edge of the coin, indicated by the numeral 80a, engages the cam surface 80, and the coin is thus forced downward to depress the latch 76 (dotted lines, Fig. 3), and thus move the latch end 77 out of the path of the shoulder 66. The bottle may now be completely withdrawn from the box 42, with the slide 46 being moved to the left by the bottle without obstruction.

During this latter movement, the head 64 passes over the coin slot 76a of the latch, through which the coin falls into the underlying coin box R. It will be obvious that during this operation the guard plate 56 on the release slide 46 will approach the stationary plate on the box 42 and close the bottle entry gap, thus preventing other bottles from being inserted in the box 42.

When the bottle B is completely withdrawn from the box 42, the release plate is restored to its initial position by the spring 51.

When it is attempted to remove a bottle without inserting a coin in the mechanism, the shoulder 66 of the head will engage the latch end 77, and thus prevent further bottle releasing movement of the slide 46.

It will be understood by those skilled in the art that the invention is susceptible of numerous variations and modifications without departing from the inventive concept, as set forth in the following claims.

We claim:

1. A bottle dispensing mechanism comprising a stationary member and a relatively movable member, resilient means for releasably moving the movable member into spaced relation with the stationary member to permit the neck of a bottle to be received in protruding relation between said members, said movable member being adapted to be moved to an open position by the physical action resulting from lifting a bottle from between said members, latch means positioned for engagement by the movable member upon opening movement thereof, and coin-controlled means for releasing said latch means from engaging position with said movable member.

2. A bottle dispensing mechanism comprising a stationary member and a relatively movable member, resilient means for releasably moving the movable member into spaced relation with the stationary member to permit the neck of a bottle to be received in protruding relation between said members, said movable member being adapted to be moved to an open position by the physical action resulting from lifting a bottle from between said members, said members being also formed with terminal portions disposed for approach relative to each other upon opening movement of said movable member, whereby the entry between said members is closed to other bottles during the removal of the positioned bottle, latch means disposed for engagement by the movable member upon opening movement thereof, and coin-controlled means for moving said latch means from engaging position with said movable member.

3. A bottle dispensing mechanism comprising a stationary member and a relatively movable member, resilient means for releasably moving the movable member into spaced relation with the stationary member to permit the neck of a bottle to be received in protruding relation between said members, a bottle magazine communicating with said members and including an aisle structure leading to the space between said members, said movable member being adapted to be moved to an open position by the physical action resulting from lifting a bottle from between said members, said members being formed with depending skirt portions adjacent said aisle, said portions being disposed for relative approach upon opening movement of said movable member to close communication between said aisle and said members, and coin-controlled means for releasing said movable member for opening movement.

4. A bottle dispensing mechanism comprising a stationary box having an opening in its side and top into which a bottle may be inserted with its neck projecting above the box, a movable slide member mounted for sliding movement within the box and having a portion adapted to form an aisle with said box opening wherein the neck of a bottle is imprisoned, a spring for retaining the slide member in such position, said movable slide member being adapted to be moved against the urge of said spring by the physical action resulting from lifting a bottle from the box, said movable slide member also having a depending skirt portion disposed adjacent one side of the opening in the side of said box, said portion being movable to block said opening during removal of the bottle in said box, and coin-controlled means for releasing said movable member for opening movement.

5. A bottle dispensing apparatus comprising a cabinet having an open top, a magazine rack disposed in the cabinet and below the top thereof, said rack comprising a plurality of parallel spaced bars, the spacing between the adjacent bars being such as to admit the neck portion of the bottle but not the body portion thereof, means in the cabinet adjacent one end thereof for holding the magazine from vertical removing movement, and means at the other end of the cabinet for releasably engaging at least one of the magazine bars to hold the engaged end of the magazine from vertical removing movement, said means at said other end being adapted to be locked, whereby the magazine is securely positioned in the cabinet against unauthorized removal, but may be removed upon disengagement of the lockable means.

6. A bottle dispensing apparatus comprising a cabinet having an open top, a magazine rack disposed in the cabinet below the top thereof, said magazine rack comprising a plurality of longitudinally disposed parallel bars, said bars being spaced sufficiently to admit the neck, but not the body, of a bottle, the magazine extending from side to side of the cabinet, bracket means mounted on the side walls of the cabinet adjacent one end thereof and having portions overlying the magazine to hold the magazine from vertical removing movement, said magazine terminating short of each end of the cabinet, means at one end of the cabinet for individually removing bottles from the magazine, and removable means at the opposite end of the cabinet for closing the space between said end and the magazine and holding said magazine in place.

7. A bottle dispensing apparatus comprising a cabinet having an open top, side walls and end walls, and a bottom wall, a bottle supporting magazine removably mounted in the cabinet between the side walls and intermediate the top and bottom wall, said magazine comprising a plurality of parallel inverted T-bars spaced sufficiently to admit the necks of bottles between adjacent edges thereof but not the widest part of the bottles, the space between said bars being open at their ends, cross rods disposed transversely of the T-bars and secured to the webs thereof, whereby a bottle may be slid along the bars and underneath the cross rods, brackets mounted on the side walls for receiving the ends of the cross rods and thereby suspending the magazine in the cabinet, the brackets for one rod overlying the same, a locking plate at one end of the cabinet releasably engaging the magazine, said plate, when released, permitting the loading of bottles into the magazine and the removal of the magazine from the cabinet, a transverse aisle formed in the cabinet at the opposite end thereof in open communication with the spaces between the bars, said aisle being of substantially the same width as the distance between the bars, whereby a bottle may be moved from any position in the magazine into and through the aisle, a receiving slot formed at one point in the aisle, and means responsive to a lifting movement of a bottle in the slot for increasing the size thereof to effect the removal of the bottle.

8. Bottle dispensing apparatus comprising a cabinet having an open top, a rack having a plurality of parallel aisles from which bottles may be slidably suspended from their neck portions, means for removably mounting the rack within the cabinet, one end of said rack being spaced from the adjacent wall of the cabinet to permit the insertion of bottles in said aisles, a lock member movable to a position obstructing the space between said end and wall, a transverse aisle structure communicating with the opposite end of said rack and the aisles thereof, a bottle release mechanism including a bottle imprisoning aisle communicating with said transverse aisle, and coin-controlled mechanism operative to control the movement of the bottle release mechanism.

HOWARD D. WHITE.
GREGG F. FORSTHOEFEL.